United States Patent
Kamiya et al.

(10) Patent No.: US 7,818,815 B2
(45) Date of Patent: Oct. 19, 2010

(54) COMMUNICATION DEVICE

(75) Inventors: Dai Kamiya, Tokyo (JP); Kazuhiro Yamada, Kanagawa (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1071 days.

(21) Appl. No.: 10/514,685

(22) PCT Filed: May 16, 2003

(86) PCT No.: PCT/JP03/06099
§ 371 (c)(1),
(2), (4) Date: Jun. 14, 2005

(87) PCT Pub. No.: WO03/098442

PCT Pub. Date: Nov. 27, 2003

(65) Prior Publication Data

US 2005/0235291 A1    Oct. 20, 2005

(30) Foreign Application Priority Data

May 17, 2002    (JP) .................... 2002-143608

(51) Int. Cl.
*G06F 17/30* (2006.01)
(52) U.S. Cl. ............................. 726/30
(58) Field of Classification Search ........... 726/30
See application file for complete search history.

(56) References Cited

U.S. PATENT DOCUMENTS

| | | | |
|---|---|---|---|
| 5,675,782 A * | 10/1997 | Montague et al. ............ | 726/4 |
| 5,790,423 A * | 8/1998 | Lau et al. ................... | 700/94 |
| 5,848,232 A | 12/1998 | Lermuzeaux et al. | |
| 6,088,708 A * | 7/2000 | Burch et al. ................ | 715/229 |
| 6,173,404 B1 | 1/2001 | Colburn et al. ............. | 713/200 |
| 6,199,046 B1 | 3/2001 | Heinzle et al. | |

(Continued)

FOREIGN PATENT DOCUMENTS

CN    1292897    4/2001

(Continued)

OTHER PUBLICATIONS

Deitel et al., "Java—How to Program", 1999, Prentice Hall, Third Edition, pp. 366-371 and 774-816.*

(Continued)

*Primary Examiner*—Nasser Moazzami
*Assistant Examiner*—Michael S McNally
(74) *Attorney, Agent, or Firm*—Brinks Hofer Gilson & Lione

(57) ABSTRACT

With regard to data, stored in mobile phone 40, whose a security level is high and contents whose copyrights are protected, mobile phone 40 encapsulates data and contents, and includes the encapsulated data or the encapsulated contents. Further, mobile phone 40 processes the encapsulated data as a perfect encapsulated object utilizing only a method which is not authorized access to the encapsulated data by an executed program (E.g. Downloaded Java Applications). Java AP downloaded to mobile phone 40 instructs a perfect encapsulated object to process the encapsulated data in the perfect encapsulated object by using a method belonging to the perfect encapsulated object. Therefore, this invention makes it possible to ensure securities for programs to be provided through the network without losing diversifications of programs.

30 Claims, 10 Drawing Sheets

U.S. PATENT DOCUMENTS

| | | | |
|---|---|---|---|
| 6,219,787 | B1 | 4/2001 | Brewer |
| 6,704,873 | B1 | 3/2004 | Underwood |
| 6,871,277 | B1 | 3/2005 | Keronen |
| 7,093,298 | B2 | 8/2006 | Rodriquez et al. |
| 7,644,444 | B2 | 1/2010 | Kamiya et al. ............ 726/29 |
| 2001/0029581 | A1* | 10/2001 | Knauft ............ 713/193 |
| 2002/0103942 | A1* | 8/2002 | Comeau ............ 709/321 |
| 2002/0120859 | A1 | 8/2002 | Lipkin et al. |
| 2004/0142682 | A1 | 7/2004 | Kamiya et al. |
| 2009/0193515 | A1 | 7/2009 | Kamiya et al. ............ 726/17 |

FOREIGN PATENT DOCUMENTS

| | | |
|---|---|---|
| EP | 1 061 440 A2 | 12/2000 |
| JP | 11272616 A * | 10/1999 |
| JP | 2001-043176 A | 2/2001 |
| JP | 2001-350664 A | 12/2001 |
| WO | WO 00/28398 | 5/2000 |

OTHER PUBLICATIONS

Supplementary European Search Report issued Nov. 5, 2007 in European patent application No. 03723394.7.
IBM Cryptolope Live!, "The Cryptolope Live! Product", XP002908144, General Information Guide, Version 1 Release 1, 1997, pp. 1-36.
Gong, "Java Security Architecture (JDK1.2).", Version 1.0, XP-002171445, pp. 1-62, Dec. 6, 1998.
Kaplan, "IBM Cryptolopes, SuperDistribution and Digital Rights Management", XP-002132994, Dec. 30, 1996.
Oaks, "Java Security, The Default Sandbox", XP-002286453, May 2001 pp. 18-21.
Kaku, T. et al., "Hajimete no i-mode Java Programming (Introduction to Java Programming in i-mode)", *Nikkei Business Publications, Inc.* Mar. 26, 2001, pp. 30-41.
Oaks, S. "Java Security, $2^{nd}$ Edition" *O'Reilly Media, Inc.*, May 2001, Chapter 2 and 4.
"i-α ppli Content Kaihatsu Guide for DoJa-3.0 Shosai-Hen (i-α ppli Content Developer's Guide for DoJa-3.0 Functional Descriptions)" *NTT DoCoMo, Inc.* Apr. 17, 2003.
Yamato, T., Ketai Yogo no Kiso Chisiki Dai 132 Kai: i-Appli DX towa? (Basic Terminology in Mobile Phone Technology Series 132: What is i-Appli DX?), *Impress Corp.*, May 13, 2003.
Chinese Office Action issued May 12, 2006.
Anonymous: "The Common Object Request Broker: Architecture and Specification" *Internet Article "Online!"* <URL: http://www.omg.org/docs/formal/97-02-25.pdf>, XP002286451, Feb. 25, 1997, 28 Pages.
Magelang Institute: "Introduction to CORBA", *Internet Article "Online!"* <URL: http://java.sun.com/developer/onlineTraining/Downloads/CORBA-JDC.ZIP>, XP002286452, Dec. 3, 1999, pp. 1-24.
Search Report issued Aug. 20, 2004 in European patent application No. 03023298.7.
"Introduction to CORBA", http://java.sun.com/developer/onlineTraining/cobra.html, Dec. 3, 1999, pp. 1-22.
Notice of Allowance mailed Sep. 18, 2009, in U.S. Appl. No. 10/684,968 (9 pages).

* cited by examiner

| DATA NAME | TYPE DESIGNATION INFORMATION |
|---|---|
| ADDRESS BOOK DATA | 1=(PERFECT ENCAPSULATIONTYPE) |
| E-MAIL DATA | 1 |
| INCOMING AND OUTGOING CALL DATA | 1 |
| USER DATA | 1 |
| CONTENT A (COPYRIGHT PROTECTION FLAG"1") | 1 |
| CONTENT B (COPYRIGHT PROTECTION FLAG"0") | 0=(PERFECT ENCAPSULATIONTYPE) |
| OWN IMAGE DATA | 0 |
| ⋮ | ⋮ |

COMMUNICATION DEVICE

TECHNICAL FIELD

The present invention relates to technology for ensuring security in a communication device and protecting copyright of the contents.

BACKGROUND ART

A communication device such as a personal computer, or a mobile telephone having a packet communication function, is able to download various types of programs downloaded from a server connected to the Internet.

While an open network such as the Internet enables people worldwide to exchange programs freely, it also has inherent risks, including, for example, data theft from a communication device. Also, a program which causes a malfunction in a communication device may be provided without malicious intent.

Accordingly, a problem might occur if a resource inside or outside a communication device is accessed easily by a program, provided through a network, without any restrictions. For example, a user's telephone number, mail address or bank account number, each of which is stored in a communication device, may be freely read out from the communication device. In view of these risks, user's privacy is a major concern.

It is possible to restrict the functions of programs provided to communication devices. For example, a mobile phone which is able to execute programs written in Java® imposes restrictions on such programs. Specifically, programs are only authorized to access the restricted resources, and programs are not authorized to access resources such as address book data or user's personal information.

DISCLOSURE OF INVENTION

The mechanism of restricting access to resources, as described above, provides some security for users of communication devices. However, it causes various restrictions in the operation of programs downloaded through the network. That is to say, it restricts program diversification such as function modifications or additions in communication devices.

However, in the operation of programs downloaded through the network, if such downloaded programs are freely able to access resources without any restrictions, a malfunction may be caused by downloaded programs provided by a malicious user, or by downloaded programs which cause a malfunction in a communication device. Then, it is possible to cause a malfunction not only to a communication device which executed downloaded programs, but also to communication devices which communicated with the communication device which executed downloaded programs.

The present invention has been made with a view to overcoming the above-mentioned problems, and has as its object the provision of a communication device, program and recording media or providing a diversity of programs while ensuring security for programs.

To solve the above problems, the present invention provides a communication device comprising a receiving means for receiving a program; a specifying means for specifying data to be used from among data stored in the communication device when a program received by the receiving means is executed; a first generation means for generating a perfect encapsulated object having a method, the method which processes encapsulated data from an outside object, the object having the encapsulated data being specified by the specifying means, and which denies access to the encapsulated data by the executed program received by the receiving means; and an access control means for restricting accessible resources, prohibiting access to data specified by the specifying means from among data stored in the communication device, but authorizing access to the object generated by the first generation means when a program received by the receiving means is executed.

Further, the present invention provides a program for enabling a computer to execute a receiving step for receiving a program by a communication terminal; a specifying step for specifying data from among data stored in a storing unit, the data to be used when the program received by a receiving step is executed; a generation step for generating an object having a method, which processes encapsulated data from an outside object, the object having the encapsulated data being specified by the specified step, and which denies access to the encapsulated data by the executed program received by the receiving step; and an access control step for restricting accessible resources, prohibiting access to data specified by the specifying step from among data stored in a storing unit, but authorizing access to the object generated by the first generation step when a program received by the receiving step is executed.

According to the invention, a communication device is able to access an object having encapsulated data to be used in the execution of the received program. During the execution of the process performed on the basis of the received data, a communication device is not able to obtain the data encapsulated in an object; however, the communication device is able to process data in the object by a method belonging to the object.

Further, the present invention provides a communication device comprising a receiving means for receiving a program; a specifying means for specifying data to be used from among data stored in the communication device when a program received by the receiving means is executed; a first generation means for generating a perfect encapsulated object having a method which method processes encapsulated data from an outside object, the object having the encapsulated data being specified by the specifying means, and which denies access to the encapsulated data by the executed program received by the receiving means; a second generation means for generating an imperfect encapsulated object having at least one method which processes encapsulated data from an outside object, the object having the encapsulated data being specified by the specifying means, and which denies access to the encapsulated data by the executed program received by the receiving means; a protection information storing means for storing protection information indicating whether data protection is necessary; a determination means for determining whether an object is generated by the first generation means or the second generation means, the object having the encapsulated data and a method for processing the encapsulated data, on the basis of the protection information stored in the protection information storing means; and an access control means for restricting accessible resources, and prohibiting access to data specified by the specifying means from among data stored in the communication device, but authorizing access to the perfect encapsulated object generated by the first generation means when a program received by the receiving means is executed.

Further, the present invention provides a program for enabling a computer to execute a receiving step for receiving a program at a communication terminal; a specifying step for specifying data from among data stored in a storing unit, the data to be used when the program received by the receiving step is executed; a determination step for determining whether an object is a first object which authorizes access to the encapsulated data by the executed program or a second object which denies access to the encapsulated data by the executed program, the object having the encapsulated data and a method for processing the encapsulated data, on the basis of protection information stored in the protection information storing means the protect information, set to specified data by specifying means, indicating whether the specified data is necessary; a generation step for generating a first or a second object determined by the determination step; and an access control step for restricting accessible resources, and prohibiting access to data specified by the specifying step from among data stored in a storing unit, but authorizing access to the perfect encapsulated object generated by the first generation step when a program received by the receiving step is executed.

According to the present invention, a communication device is able to access an object having encapsulated data to be used in the execution of the received program. Further, a communication device determines an object type to be generated on the basis of protection information indicating whether data protection is necessary, the protection information set to data to be encapsulated. Further, a communication device determines whether to obtain encapsulated data in an object in the execution of the received program.

Further, the present invention may be performed by a mode which distributes the above programs to users through a communication line, or which stores the programs in a recording media such as FD, CD and a MO disk each of which is readable by computer.

BRIEF DESCRIPTION OF THE DRAWINGS

FIG. 3 is a diagram showing the data configuration of a type designation table stored in nonvolatile memory in a mobile phone according to the first embodiment.

PREFERRED EMBODIMENTS

The first embodiment of the present invention will be described with reference to the diagrams. Like numerals denote like elements in the figures.

A-1. Configuration of the Embodiment

<1. Configuration of a Communication System>

Figure 1:
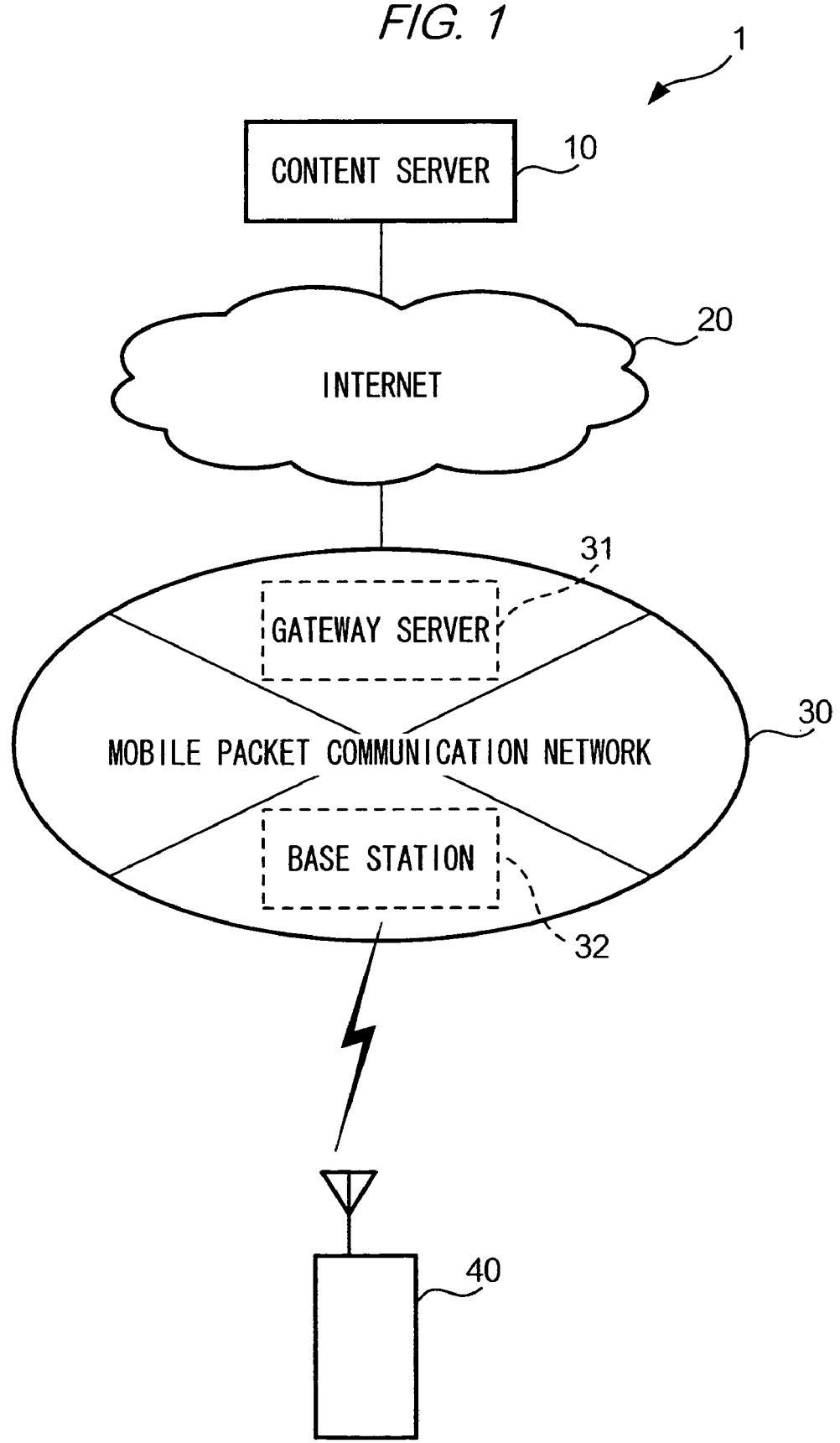
FIG. 1 is a block diagram showing the configuration of a communication system according to the first embodiment of the present invention.

FIG. 1 is a block diagram showing the configuration of a communication system 1 according to the first embodiment of the present invention. As shown in this figure, communication system 1 is comprised of a content server 10, the Internet 20, a mobile packet communication network 30, and a mobile phone 40. In general, in this communication system 1, a plurality of mobile phones 40 are located. However, for the sake of simplicity, only one mobile phone 40 is shown in FIG. 1. For the same reason, only one content server 10, one content server 31, and one base station 32 are shown in FIG. 1.

Content server 10 has a function of executing a packet communication with mobile phone 40 via the Internet 20 and mobile packet communication network 30. Various contents such as a program to be provided to mobile phone 40, or image data and music data are stored in content server 10. One of the contents is Java Application program (Hereafter, referred to as "Java AP") which can be executed in mobile phone 40. This Java AP is an application program for mobile phone 40, the application program written in a Java programming language such as Java Applet or Java Application.

Mobile packet communication network 30 is a communication network for providing a packet communication service with mobile phone 40, and has a gateway server 31 and a base station 32. Communication system 1 has a mobile communication network (not shown) in addition to mobile packet communication network 30. This mobile communication network provides a communication service for a regular mobile phone to mobile phone 40.

Gateway server 31 translates data whose communication protocols are different, for example a communication protocol for mobile packet communication network 30 and a communication protocol for the Internet 20, and relays the transmission and reception of data between mobile packet communication network 30 and the Internet 20. Further, a plurality of base stations 32 are located in a communication service area of mobile packet communication network 30, and base station 32 executes radio communication with mobile phone 40 which is active in a radio cell covered by base station 32.

Further, mobile phone 40 executes radio communication with base station 32 which covers a radio cell in which mobile phone 40 is active. Further, mobile phone 40 has a function of executing a packet communication with content server 10 through mobile packet communication network 30 and the Internet 20, and is able to download contents from content server 10.

<2. Configuration of a Mobile Phone>

Figure 2:
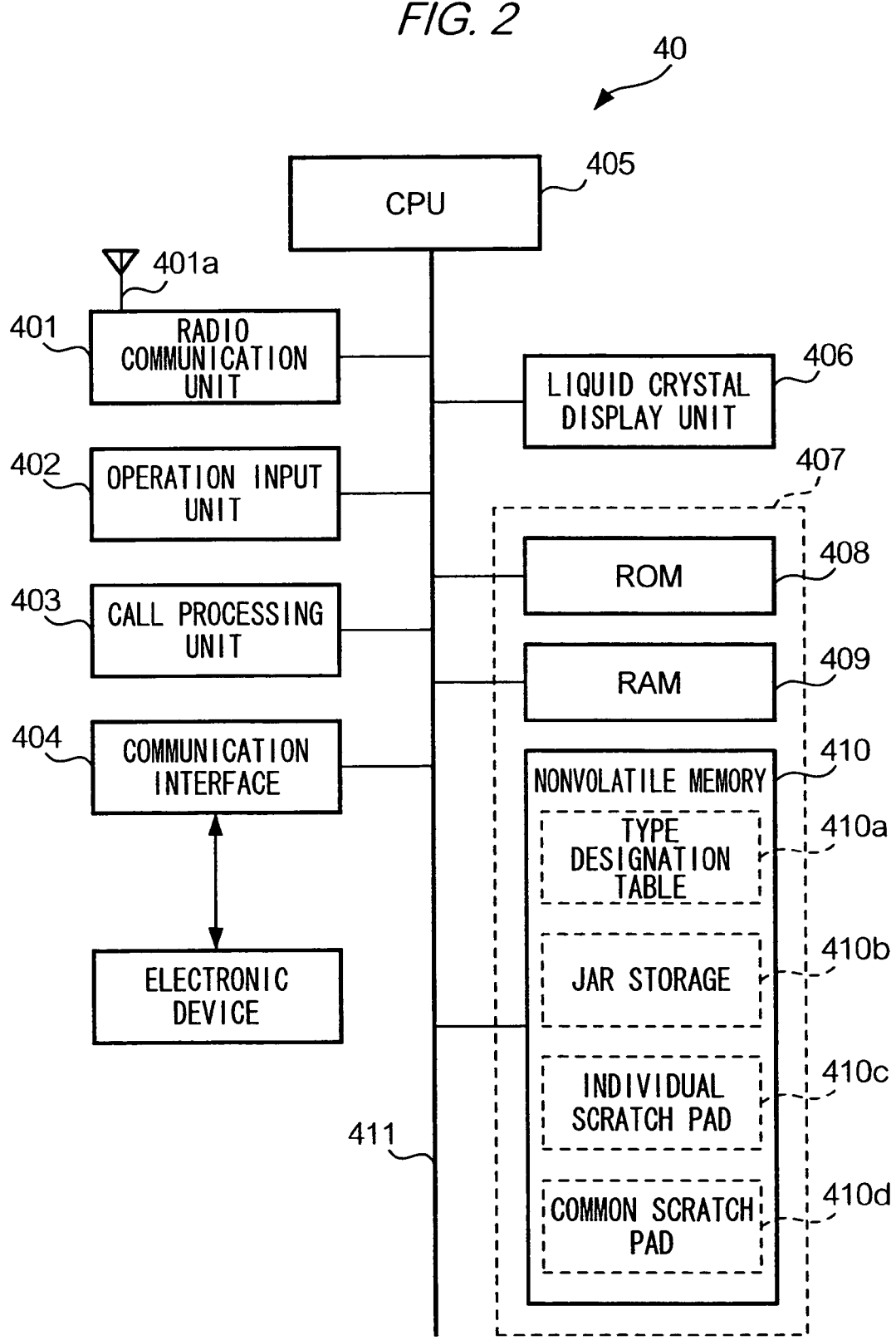
FIG. 2 is a block diagram showing the hardware configuration of a mobile phone according to the first embodiment.

FIG. 2 is a block diagram showing the hardware configuration of mobile phone 40. As shown in this figure, mobile phone 40 is comprised of a radio communication unit 401, an operation input unit 402, a call processing unit 403, a communication interface 404, and CPU 405, a liquid crystal display unit 406, and memory unit 407, which are connected to each other by bus 411.

Radio communication unit 401 has an antenna 401a, and controls radio communication with base station 32. Radio communication unit 401 generates a transmission signal by superimposing voice data or packet communication data on a carrier wave under the control of CPU 405, and transmits this signal to base station 32. Further, radio communication unit 401 receives a radio signal transmitted from base station 32 through antenna 401a, and obtains voice data for mobile phone 40 and packet communication data by demodulating this signal.

Operation input unit 402 has a plurality of keys for inputting numbers, characters, instructions for operation and the like, and outputting operation signals corresponding to key operations, to CPU 405. Further, processing unit 403 has, for example, a microphone, a speaker, a voice processing unit and the like, and executes a call process including a call connection/disconnection under the control of CPU 405.

Communication interface 404 controls a wired communication with electronic devices connected through a communication cable. This communication interface 404 may be the type which controls a close range radio communication such as infrared communication, HomeRF (Home Radio Frequency), or Bluetooth®. Further, CPU 405 controls each control unit connected via bus 411 by executing various programs stored in memory unit 407. Further, liquid crystal display unit 406 is comprised of a liquid crystal display panel and a drive circuit for executing a display control of the liquid crystal display panel.

Memory unit 407 is comprised of ROM 408, RAM 409, a nonvolatile memory 410 such as SRAM (Static RAM) and EEPROM (Electrically Erasable Programmable-ROM). Software such as an operating system (Hereafter, referred to as "OS") for mobile phone 40 and Web (World Web Wide) browser, or software for constructing Java execution environment are stored in ROM 408. Further, RAM 409 is used as a work area for CPU 405, and various programs and data executed by CPU 405 are stored in RAM 409 temporarily.

Programs designed for mobile phone 40 are stored in nonvolatile memory 410 from the time of shipping mobile phone 40. Contents such as Java AP downloaded from content server 10 are stored in nonvolatile memory 410. Additionally, various data is stored in nonvolatile memory 410, such as address book data which includes data for showing a telephone number or an e-mail address, received or transmitted e-mail data, incoming and outgoing call data, data for showing a user's bank account number to enable electronic payment, and data for showing a credit card number.

Hereafter, a program stored in ROM 408 and nonvolatile memory 410 at the time of shipping mobile phone 40 is referred to as a "Native Application" to distinguish downloaded Java AP. Identification information is given to a native application, showing the program is a native application.

Further, nonvolatile memory 410 is comprised of a type designation table 410a, a JAR storage 410b, an individual scratch pad 410c, and a common scratch pad 410d. Firstly, type designation table 410a will be described with reference to FIG. 3. As shown in FIG. 3, data name and type designation information are registered in type designation table 410a, each of which corresponds each other with regard to data stored in nonvolatile memory 410, such as address book data, e-mail data, incoming and outgoing call data, and user data, possibly used by downloaded Java AP when downloaded Java AP is performed. Type designation information is the information for designating whether an object type for data is a perfect encapsulated object or an imperfect encapsulated object. User data described above is personal information with regard to a user of mobile phone 40, for example, user's name, age, date of birth, bank account number, and credit card number.

As shown in FIG. 3, type designation information is 1 bit data whose information value is 1 or 0. When the value of type designation information is set to 1, an object type is designated as a perfect encapsulated object, and when the value of type designation information is set to 0, an object type is designated as an imperfect encapsulated object.

An encapsulated object is an object having one or more than one item of encapsulated data (Information is encapsulated) and at least one method for operating encapsulated data from an outside object. Then, a perfect encapsulated object is an object whose configuration does not have methods which authorize access to encapsulated data by an executed program (E.g. Downloaded Java Application), for the object. An imperfect encapsulated object is an object configured to have at least one method for authorizing access encapsulated data by an executed program for the object. The difference between a perfect encapsulated object and an imperfect encapsulated object is whether an object has methods which authorize access to encapsulated data in an object by an executed program.

That is to say, type designation table 410a in FIG. 3 shows that each item of data is processed as a perfect encapsulated object, or an imperfect encapsulated object. For example, in FIG. 3, address book data, e-mail data, incoming and outgoing call data, and user data are especially important data for security reasons among data stored in mobile phone 40. On the other hand, Java AP downloaded in mobile phone 40 is a program which is not secure. Accordingly, although Java AP generated by a malicious person is downloaded in mobile phone 40, important data must be protected such that it cannot be accessed from outside mobile phone 40 through Java AP.

Consequently, important data is processed as a perfect encapsulated object, and it is necessary to deny access to data by downloaded Java AP. For the above reasons, in type designation table 410a in FIG. 3, "1" (Perfect Encapsulated Object) is set to address book data, e-mail data, incoming and outgoing call data, and user data as a value for type designation information.

Further, in type designation table 410a in FIG. 3, content A and content B are contents such as image data or music data, both of which are downloaded from content server 10. A copyright protection flag is provided to the contents by content providers. A copyright protection flag is 1 bit data whose flag value is 1 or 0. When the value of a copyright protection flag is set to 1, copyright of the contents to which a flag is provided must be protected, and when the value of a copyright protection flag is set to 0, copyright of the contents to which a flag is provided must be abandoned.

With regard to the contents whose copyright must be protected, if the content data is provided to downloaded Java AP, the contents may be used by Java AP in a manner which is not authorized by content providers, or transmitted outside mobile phone 40 through Java AP. Accordingly, content data is processed as a perfect encapsulated object, the content data to which "1" is provided as a value of copyright protection flag, and it is necessary to deny access to the content data by downloaded Java AP. For the above reason, in type designation table 410a, "1" is set to content A as a value of type designation information.

On the other hand, with regard to the content data to which "0" is provided, since its copyright is abandoned, it is not necessary to process the content data as a perfect encapsulated object. In this case, it is necessary to authorize access to the content data by downloaded Java AP, thereby providing even more diversification to Java AP. Therefore, "0" (imperfect encapsulated object) is set to content B as a value of type designation information.

Further, in type designation table 410a, "1" is set to address book data, e-mail data, incoming and outgoing call data, and user data in advance as a value of type designation information. Further, with regard to downloaded contents, when contents are downloaded to mobile phone 40, a value of type designation information is determined by CPU 405, the value corresponding to a value of a copyright protection flag provided to contents. Then, the type designation information is registered with type designation table 410a along with content identification information (data name)

Further, with regard to data generated in mobile phone 40, or with regard to image data and music data generated by a user by using PC and downloaded to mobile phone 40 through communication interface 404, a user is able to set an object type for the data by operation input, the object type which is a perfect encapsulated type or an imperfect encapsulated type. Further, by input operation, a user may display the details of type designation table 410a on a crystal display, and modify type designation information on each item of data except for the content data to which a copyright protection flag is provided.

Next, in FIG. 2, nonvolatile memory 410 is comprised of a JAR (Java Archive) storage 410b, an individual scratch pad 410c, and a common scratch pad 410d in addition to type designation table 410a. Here, Java AP to be downloaded into mobile phone 40 will be described before individual scratch pad 410c and common scratch pad 410c. Java AP is comprised of a JAR file which is a main program for Java AP, and an image file and a sound file to be used together in the execution of the main program for Java AP, along with an ADF (Application Describer File) in which various control information is written, for installing and activating JAR file and controlling the network access.

Storage area for Java AP is installed in JAR storage 410b and individual scratch pad 410c per downloaded Java AP. JAR file for Java AP is stored in each storage area of JAR storage 410b. Further, for example, generated data for Java AP in accordance with the usage of Java AP, such as past score data or save data, is stored in each storage area of individual scratch pad 410c if Java AP is a game program. Further, data which a plurality of Java Application programs commonly uses is stored in common scratch pad 410d.

Further, when Java AP is executed in mobile phone 40 after the completion of downloading Java AP, resources which mobile phone 40 is able to access are restricted to a content server 10 from which programs are downloaded, a storage area assigned to Java AP, JAR storage 410b and individual scratch pad 410c, and common scratch pad 410d, but mobile phone 40 is not authorized to access other resources.

<3. Java Execution Environment>

Figure 4:
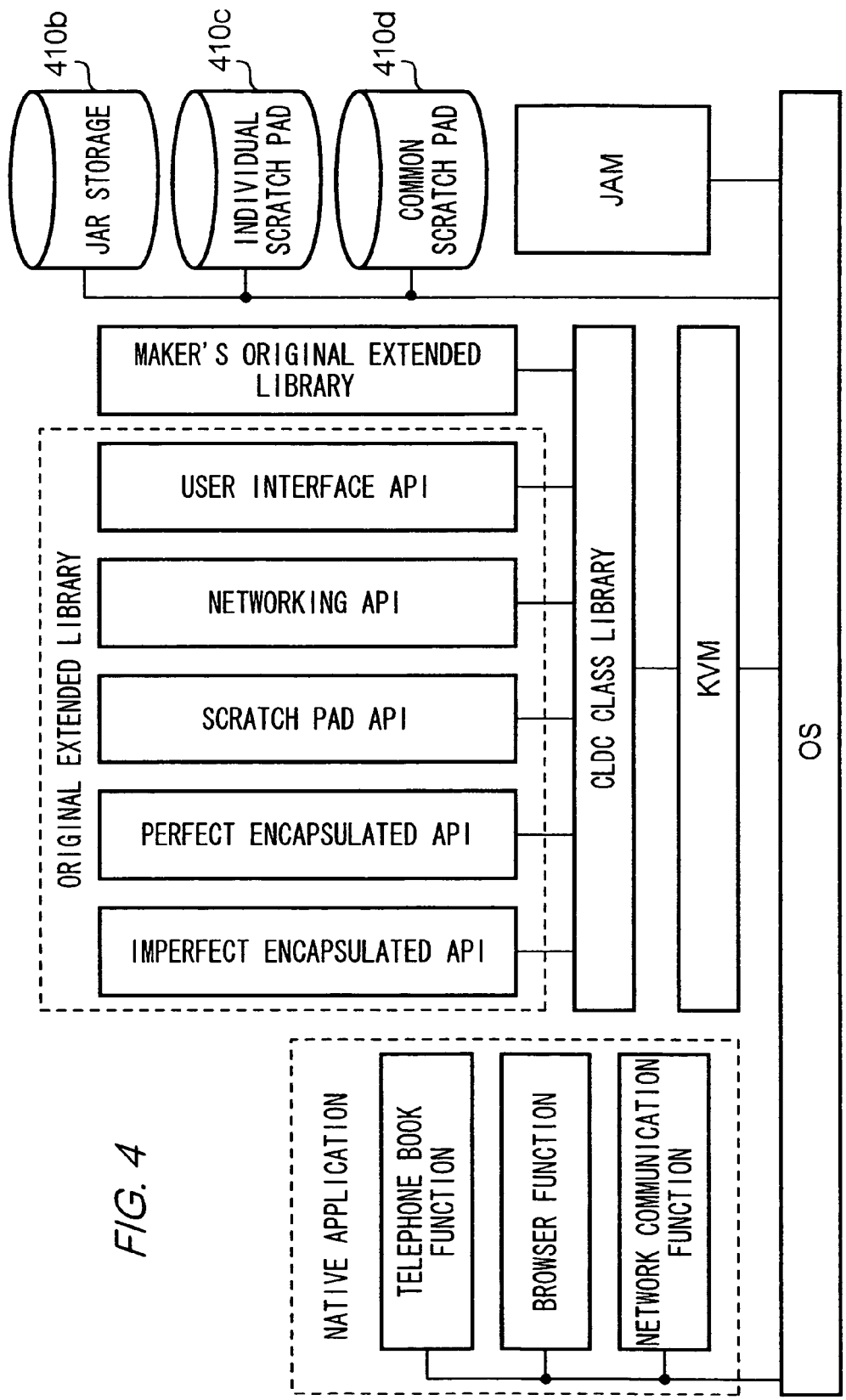
FIG. 4 is a diagram explaining execution environment of Java AP in a mobile phone according to the first embodiment.

FIG. 4 is a diagram explaining execution environment of Java AP in mobile phone 40. In this figure, software for constructing the execution environment of Java AP (KVM (K Virtual Machine)), a configuration (CLDC(Connected Limited Device Configuration)), and a profile (an original extended library originally developed by a telecommunication carrier) are stored in mobile phone 40.

Further, J2ME (Java 2 Micro Edition) is installed in mobile phone 40, the J2ME comprised of an original extension profile originally developed by telecommunication companies as a profile.

KVM is a JVM (Java Virtual Machine) redesigned for a small electronic device, and translates into an instruction code which CPU 405 is able to interpret/execute through OS, a byte code which is execution file format of Java AP. Further, CLDC class library is a class library for CLDC.

The original extended library is a class library for providing functions specified for a mobile phone on the basis of CLDC. For example, user interface API (Application Program Interface), Networking API, Scratch Pad API, Perfect Encapsulated API, Imperfect Encapsulated API, and the like are included in the original extended library.

Here, user interface API is API for supporting user interface functions of mobile phone 40, and network API is API for supporting access to network resources designated by URL (Uniform Resource Locator). Further, scratch pad API is an API for supporting writing in or reading out data for individual scratch pad 410c and common scratch pad 410d. Further, perfect encapsulated API is an API for generating a perfect encapsulated object, and an imperfect encapsulated API is an API for generating an imperfect encapsulated object.

The above programs are installed in mobile phone 40 in various manners. For example, the programs are installed in a mobile phone prior to shipping from a factory. Alternatively, the programs are downloaded from a site in the network, and installed in a mobile phone, or the programs are downloaded to a PC other than a mobile phone. In this case, the programs are stored in a storage media readable by computer such as a FD, a CD, and a MO disk, and the programs are provided to a user. Then, the programs are installed in a PC by a user.

Further, mobile phone 40 has a maker's original extended library in addition to CLDC class library and original extended library. The maker's original extended library is a class library via which each maker of mobile phone 40 provides original functions.

Next, JAM (Java Application Manager) has functions to process Java AP downloaded in mobile phone 40, a perfect encapsulated object, an imperfect encapsulated object and the like under the control of OS.

For example, Java has functions to update and to delete the installation of Java AP, to display a list of Java AP stored in nonvolatile memory 410, to process (e.g. activation and forced termination) of Java AP, to restrict the access by mobile phone 40 in the execution of Java AP, and to generate, to update and to delete a perfect encapsulated object and an imperfect encapsulated object.

Further, as shown in FIG. 4, a native application which offers a telephone book function, a browser function, or the like is directly executed under the control of an OS.

<4. Configuration of an Encapsulated Object>

Figure 5:
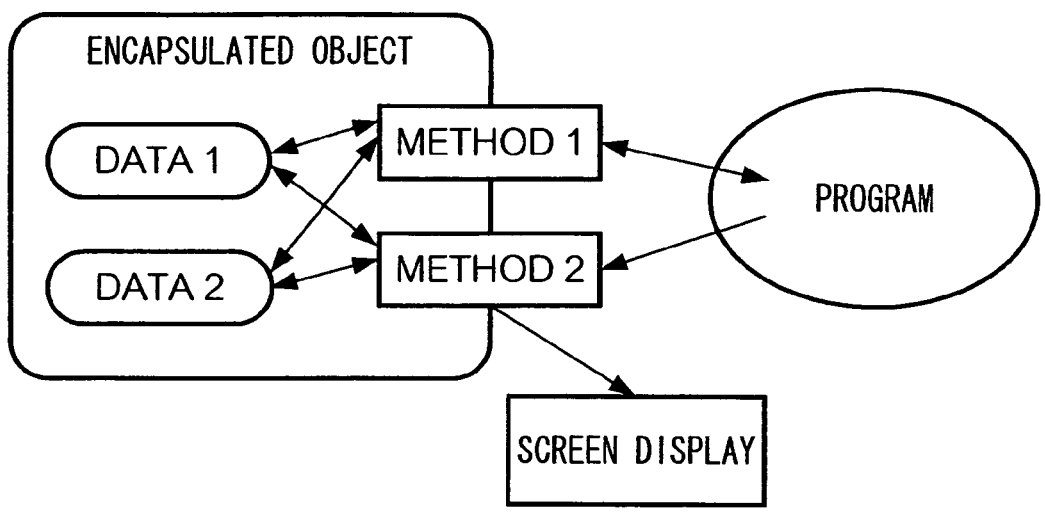
FIG. 5 is a view explaining an encapsulated object in a mobile phone according to the first embodiment.

Next, an encapsulated object will be described. FIG. 5 is a view explaining an encapsulated object. As shown in this figure, the encapsulated object is comprised of more than one item of encapsulated data, and more than one method for making possible operation of each item of encapsulated data from the outside object.

The object is a set of data ("Field" in Java programming language) and operation ("Method" in Java programming language). In Java programming language, an access indicator "private" declaring that each field in the object is a private field, is used for encapsulation of data stored in the private field. An encapsulated object is made via the encapsulation.

As shown in this figure, an encapsulated object having two items of data, data 1 and data 2, and two methods, method 1 and method 2 is shown. Since data 1 and data 2 are encapsulated in the encapsulated object, data 1 and data 2 are not directly read out or written in from an outside object. Consequently, when the downloaded program accesses data 1 and data 2 in the encapsulated object, the downloaded program has to instruct the encapsulated object to process for objective data 1 and data 2 by using method 1 and method 2.

In this figure, when method 1 is, for example, a method for providing designated data to the downloaded program, the downloaded program is able to obtain optional data 1 and data 2 in the encapsulated object by using method 1. Further, when method 2 in this figure is, for example, a method for displaying the designated data on a liquid crystal display, the downloaded program is able to display optional data 1 and data 2 in the encapsulated object by using method 2. The important point is that the program, which has displayed optional data 1 and data 2 of the encapsulated object on the display by using method 2, instructs the encapsulated object to display optional data 1 and data 2 by using method 2, even though the program itself does not obtain the data to be displayed.

More specifically, in the case of an encapsulated object (perfect encapsulated object) which does not have methods for authorizing data access by the downloaded program, the downloaded program is not able to obtain data stored in the encapsulated object, but is able to control data stored in the encapsulated object by using the methods belonging to the encapsulated object.

Accordingly, although the downloaded program is a program which is not secure (e.g. Java AP), when data such as address book data or e-mail data is processed as a perfect encapsulated object, data is not accessible by the downloaded program. Therefore, mobile phone 40 is secure. Further, although data such as address book data or e-mail data is not generally accessible for security reasons, the program is able to process (access) the data by using methods belonging to the encapsulated object.

In this embodiment, data is processed as a perfect encapsulated object, to which data "1" is set as a value of type designation information, for example, important data for security reasons such as address book data, e-mail data, incoming and outgoing call data or user data, and contents whose copyright must be protected. On the other hand, data is processed as an imperfect encapsulated object, to which data "0" is set as a value of type designation information, for example, data whose security is not important, or contents whose copyright is abandoned. Further, downloaded Java AP is authorized to access a perfect encapsulated object or an imperfect encapsulated object.

Figure 6:
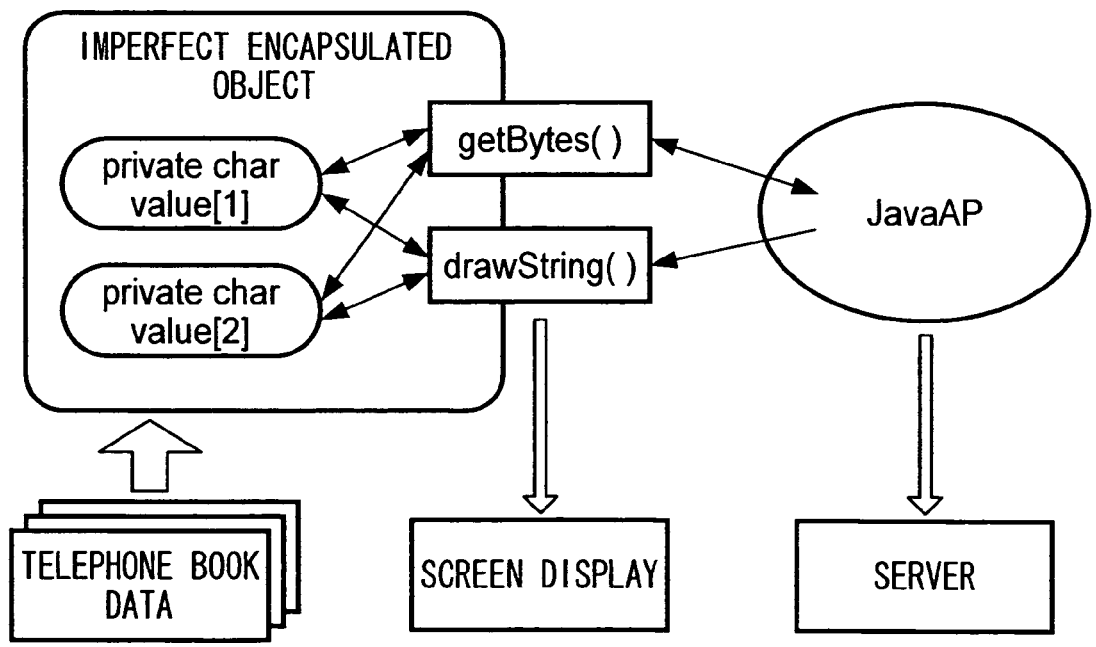
FIG. 6 is a view exemplifying an imperfect encapsulated object in a mobile phone according to the first embodiment.

FIG. 6 is a view exemplifying an imperfect encapsulated object with regard to telephone book data. In this embodiment, telephone book data is usually processed as a perfect encapsulated object as the data is important for security reasons. However, for reasons of comparison, a case will be described below wherein telephone book data is processed as an imperfect encapsulated object.

In Java programming language, encapsulation of data to be stored in a private field is executed by declaring each field in the object to be a private field via an access qualifier known as "private". In other words, every field in the object is a private field; data stored in a private field cannot be read out from the outside of an object. In such a case, to enable the program which performs the instruction to access data from the outside object, the program which performs the instruction needs to instruct the object to process (access) data stored in each private field by using methods belonging to the object.

Two private fields are installed in an imperfect encapsulated object in this figure, and character string data of a telephone book, "private char value[1]" and "private char value[2]" are stored in an imperfect encapsulated object. Further, an imperfect encapsulated object has two methods known as "getBytes( )" and "drawString( )". getBytes( ) is a method for providing data stored in an object in a byte array form to the program which performs the instruction. Consequently, downloaded Java AP is able to obtain a character string data of a telephone book, "private char value[1]" and "private char value[2]" stored in an imperfect encapsulated object by using the method, "getBytes( )". Additionally, Java AP is able to transmit the obtained character string data of a telephone book stored in an imperfect encapsulated object to content server 10 (A server which performs downloading Java AP).

Further, drawString( ) is a method for displaying data stored in an object on a liquid crystal display of mobile phone 40. Java AP is able to display character string data of a telephone book ("private char value[1]" and "private char value[2]") stored in an imperfect encapsulated object on a liquid crystal display of mobile phone 40.

Figure 7:
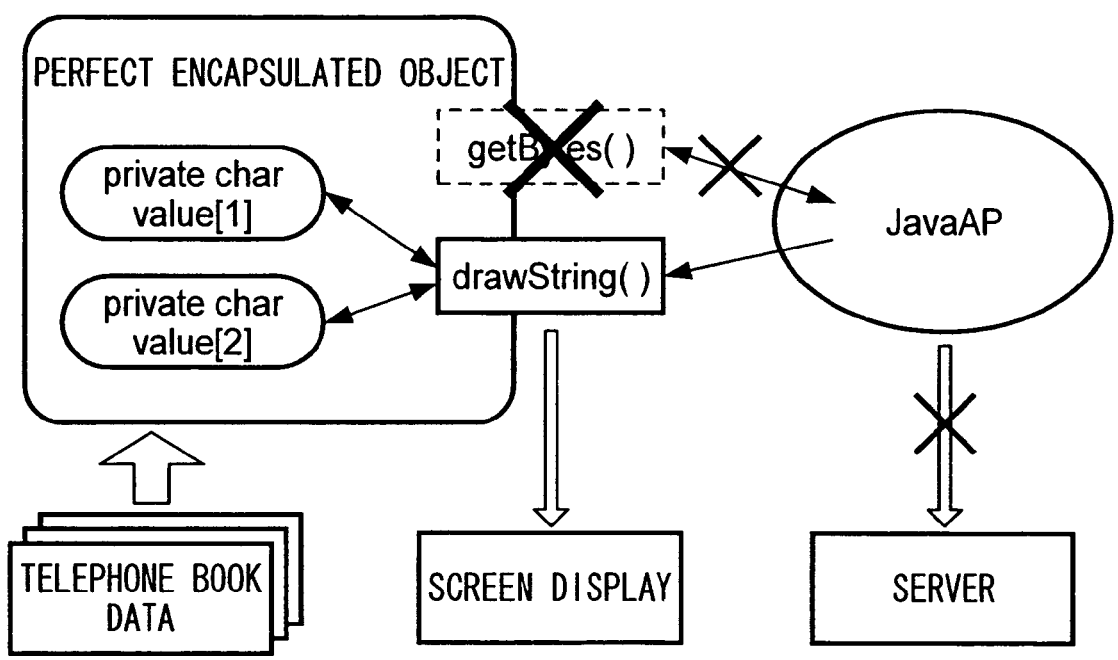
FIG. 7 is a view exemplifying a perfect encapsulated object in a mobile phone according to the first embodiment.

FIG. 7 is a view exemplifying a perfect encapsulated object with regard to telephone book data. The difference between a perfect encapsulated object in FIG. 7 and an imperfect encapsulated object in FIG. 6 is that a perfect encapsulated object does not have methods for authorizing access to data stored in an object by an executed program.

More specifically, because a perfect encapsulated object is "perfectly" encapsulated, a perfect encapsulated object does not have methods for authorizing access to data stored in an object by an executed program. Accordingly, the downloaded Java AP is able to display character string data of a telephone book ("private char value[1]" and "private char value[2]") stored in an imperfect encapsulated object on a liquid crystal display of mobile phone 40 by using the method known as "drawstring( )", but is unable to obtain character string data of a telephone book. For the above reason, even though a Java AP generated by a malicious third person is downloaded in mobile phone 40, the Java AP for stealing data, or telephone book data, the data is not accessed by such Java AP. Therefore, telephone book data cannot be transmitted to outside mobile phone 40 (e.g. to a Server).

The character string data of a telephone book stored in the object is displayed by using the method, "drawstring( )", a perfect encapsulated object and an imperfect encapsulated object display the character string data of a telephone book on a liquid crystal display by using a display control program stored in ROM 408 or nonvolatile memory 410 as a native application. If Java AP were able to obtain the displayed data by using the display control program, there would be no advantage to using a perfect encapsulated object and an imperfect encapsulated object.

However, when downloaded Java AP is executed, mobile phone 40 is restricted to accessing resources in the execution of Java AP by an access restriction function of JAM described above. Since, in executing Java AP, a display control program is not included in the resources which mobile phone 40 is authorized to access, it is impossible for Java AP to obtain displayed data from a display control program.

Further, it is plausible that an object may be encapsulated at the level of programming language, or encapsulated at the level of an executable code (machine language or byte code). If it is encapsulated in a perfect manner at the level of programming language, however, it can not also be encapsulated in a perfect manner at the level of an executable code, and therefore data is not encapsulated in a perfect manner. As an example, a program using C++(programming language) is able to generate an encapsulated object having private fields, but the program using C++ is able to achieve perfect encapsulation only at the level of programming language.

More specifically, when the program using C++ declares every field stored in the object as a private field, and generates an encapsulated object, the program does not compile a source code for reading and writing data directly stored in a private field. That is to say, an execution code is not generated for a compile error.

It should be noted that an execution code is determined only by a compiler. For example, a third person having malicious intent is able to generate an executable code for reading and writing data directly stored in a private field of an object by modifying a compiler. Further, such a person is able to create a program for generating an executable code which reads out data stored in an object by a method of user-input and the like. Moreover, it is possible to obtain data stored in an object only if a person obtains direct access to a memory by using a pointer.

On the other hand, with regard to Java, a field declared as a private field is compiled using a Java byte code showing the field has a private attribute. Even when KVM expands a class file to RAM 409, the field keeps a private attribute. Accordingly, if a third person generates a byte code for reading out data stored in a private field of an object by modifying a compiler, KVM or JAM detects the code generation and therefore, the third person cannot obtain the data stored in the object. Further, Java does not support a pointer, and therefore, a malicious third person cannot obtain data stored in an object by gaining direct access to a memory with a pointer.

For the above reasons, in Java, an object is encapsulated in a perfect manner at the level of a byte code as well as at the level of programming language. With regard to data encapsulation, besides "private", an access identifier such as "protected" or "package" are used.

The above describes the configuration of communication system 1 according to the present embodiment.

A-2. Operation of the Embodiments

Next, the operation of the embodiments will be described.

It is assumed that mobile phone 40 performs a packet communication with content server 10 through mobile packet communication network 30 and the Internet 20, and downloads Java AP from content server 10, and stores it in nonvolatile memory 410. Further, it is assumed that address book data, electronic mail data and user data are stored in nonvolatile memory 410 in addition to the downloaded Java AP (Contents), and type designation information for the above data is registered with type designation table 410a.

Further, in type designation table 410a, "1" is set to address book data, e-mail data, incoming and outgoing call data, and user data in advance as a value of type designation information. Further, with regard to downloaded contents, when contents are downloaded to mobile phone 40, a value of type designation information is determined by CPU 405, the value corresponding to a value of a copyright protection flag provided to contents. Then, type designation information and content names are registered with type designation table 410a.

<1. Object Generation Process>

The object generation process executed by CPU 405 in mobile phone 40 will be described with reference to FIG. 8. The object generation process is executed by CPU 405 as a JAM function, and, for example, is executed when a program to be executed is designated from a program list displayed on a display by an operation input. The embodiment for instructing to execute a program is not restricted to an operation input; for example, when executing a program is instructed at a predetermined time, when executing a program is instructed by other programs which have already been executed, or when executing a program is instructed via e-mail and the like from outside mobile phone 40.

Figure 8:
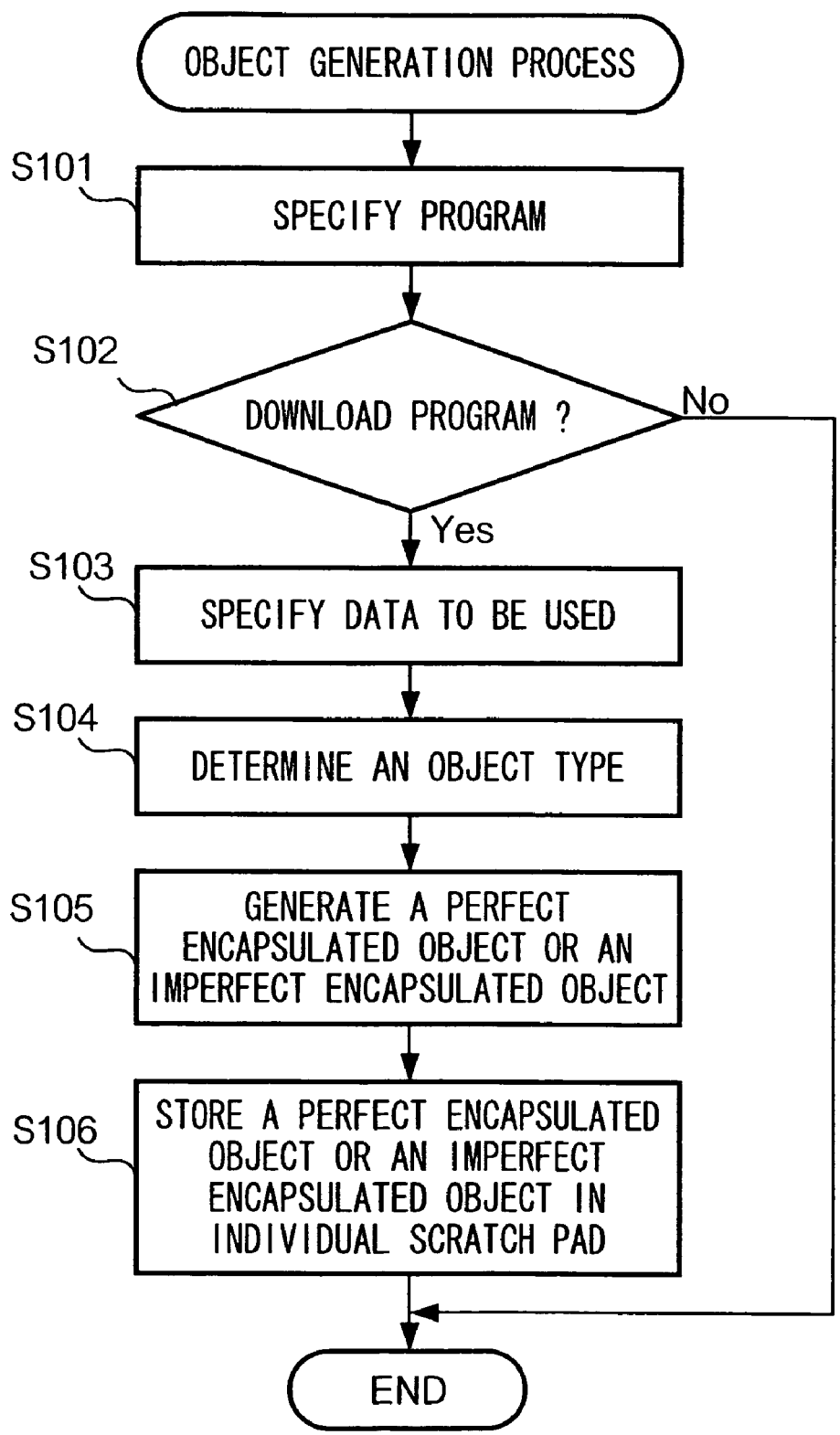
FIG. 8 is a flowchart explaining the operation of an object generating process executed by CPU in a mobile phone according to the first embodiment.

As shown in FIG. 8, CPU 405 in mobile phone 40 specifies a designated program as an executed program via an input operation (Step S101). Next, CPU 405 determines whether the specified program is downloaded Java AP, or a native application (Step S102). As described above, identification information, for showing that a program is a native application, is provided to a native application. Consequently, CPU 405 determines whether a program is downloaded Java AP or a native application, by determining whether the above identification information is provided to a program.

As a result, if CPU 405 determines that the program is a native application (Step S102:No), CPU 405 terminates an object generation process, and activates execution of the designated native application as a program to be executed. Then, CPU 405 performs processing on the basis of the executed native application.

In this case, when the program to be executed is a native application, it is not necessary to use a perfect encapsulated object or an imperfect encapsulated object, or to process an access restriction function of JAM in the execution of a native application. Consequently, when a native application is executed, an access restriction by JAM is not executed. Therefore, a native application is able to access optional resources stored in mobile phone 40, or optional resources on the network.

On the other hand, when CPU 405 determines that the program is the downloaded Java AP (Step S102:Yes), CPU 405 specifies data to be used in the execution of Java AP from various data stored in nonvolatile memory 410 by, for example, analyzing program contents for Java AP (Step S103). Further, CPU 405 specifies a method to be encapsulated along with the data to be used. When Java AP specifies data to be used, the data stored in a JAR file of Java AP is excluded as data not specified since the data stored in a JAR file is data prepared by a content provider for providing Java AP as data necessary for executing Java AP.

Next, CPU 405 determines whether the object type for processing the specified data is "a perfect encapsulated object" or "an imperfect encapsulated object" on the basis of a value of type designation information of the data specified above by referring to type designation table 410a (FIG. 3) (Step S104). For example, if Java AP uses address book data, CPU 405 refers to type designation table 410a and determines an object type as "a perfect encapsulated object", the object type for managing address book data. Further, if Java AP uses content B (a copyright protection flag is "0"), CPU 405 determines an object type as "an imperfect encapsulated object", the object type for managing content B.

CPU 405 generates a perfect encapsulated object or an imperfect encapsulated object on the basis of the specified data at Step S103 and the determined object type at Step S104 (Step 105). For example, CPU 405 activates a perfect encapsulated API in an original extended library in the case of specifying address book data (type designation information "1") in Step 103. A perfect encapsulated API selects a method specified at the time of specifying the data from methods stored in a perfect encapsulated API. Then, CPU 405 encapsulates data and a method, and generates a perfect encapsulated object for address book data. Further, CPU 405 activates an imperfect encapsulated API in an original extended library, and activates an imperfect encapsulated object for content B in the case of specifying content B in Step 103.

Next, CPU 405 stores an object in common scratch pad 410d, the generated perfect encapsulated object or the generated imperfect encapsulated object (Step S106), and terminates the object generating process. The generated perfect encapsulated object or imperfect encapsulated object in Step S105 may be stored in common scratch pad 410c.

Further, in the case of specifying a plurality of data used by Java AP in Step 103, CPU 405 repeats the process from S104 to S106 per specified data to generate a perfect encapsulated object or an imperfect encapsulated object and store these objects in common scratch pad 410d per the specified data. Then, CPU 405 activates a Java AP designated as an executable program and initiates the process on the basis of the program after terminating an object generation process.

<2. Access Management Process>

Next, the access management process executed by CPU in mobile phone 40 will be described with reference to FIG. 9. The access management process is executed by CPU 405 as a JAM a function, and is executed as an interruption process when an access request is generated in the execution process of the downloaded Java AP.

Figure 9:
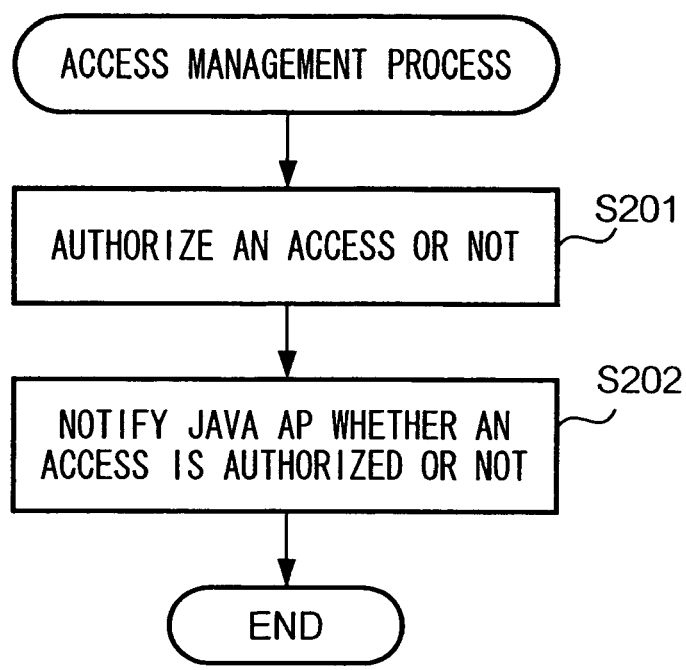
FIG. 9 is a flowchart explaining the access management process executed by CPU in a mobile phone according to the first embodiment.

As shown in FIG. 9, CPU 405 in mobile phone 40 distinguishes whether a requested access point is within the range of the pre-authorized resources, and determines whether an access (to the resources) is authorized (Step S201). To determine authorization of an access, when the downloaded Java AP is executed, CPU 405 restricts accessible resources in the execution of Java AP to the following: content server 10 which downloads Java AP designated by a URL written into ADF of Java AP, JAR storage 410b assigned to Java AP, storage area into individual scratch pad 410c, and common scratch pad 410d.

Accordingly, CPU 405 authorizes an access in the case that the requested access point(s) is(are) any of the resources described above. However, CPU 405 does not authorize an access if the requested access point(s) is (are) not among the resource(s) described above.

Next, CPU 405 notifies Java AP, which requests downloading an access, whether the access is authorized (Step S202), and terminates an access management process. Further, when Java AP in execution receives an authorization result executed by JAM, Java AP executes the process on the basis of the access request when the access is authorized; however, Java AP cancels the process on the basis of the access request when the access is not authorized.

When CPU 405 in mobile phone 40 executes the downloaded Java AP, CPU 405 activates Java AP after executing the object generation process shown in FIG. 8. Further, in the execution of the downloaded Java AP, CPU 405 executes the access management process shown in FIG. 9. Accordingly, mobile phone 40 is always restricted to access resources in the execution of the downloaded Java AP. As an example, mobile phone 40 cannot access address book data, e-mail data, incoming and outgoing call data, user data, and other data such as content, each of which stored in nonvolatile memory 410.

For the above reason, CPU 405 in mobile phone 40 specifies data to be used by Java AP to be activated in the process of the object generation process, generates a perfect encapsulated object or an imperfect encapsulated object for the specified data, and stores it in common scratch pad 410d. As described above, common scratch pad 410d is the resource which mobile phone 40 is authorized to access even though the access is restricted by JAM. Java AP downloaded into mobile phone 40 is generated in such a manner that Java AP accesses a perfect encapsulated object or an imperfect encapsulated object both of which are stored in common scratch pad 410d, and instructs the object to process data in the object by using methods belonging to the object.

For example, when a Java AP using address book data is generated, a perfect encapsulated object for address book data is generated by the object generation process described above, and a perfect encapsulated object is stored in common scratch pad 410d. Further, a Java AP instructs the generated perfect encapsulated object for address book data to process data in the object by using the methods belonging to the object. Consequently, a part of address book data belonging to a perfect encapsulated object is displayed on a display, but the data belonging to a perfect encapsulated object is not accessed by a Java AP.

In the prior art, Java AP was not able to access address book data, e-mail data, incoming and outgoing call data, user data or the like to ensure data security with respect to the downloaded Java AP. Conversely, according to the present invention, since data is not accessed by Java AP by using a perfect encapsulated object, it is possible to ensure security with respect to the downloaded Java AP, and to display data, which was not authorized to be accessed, via a perfect encapsulated object. Consequently, in the present invention, the downloaded Java AP is able to execute various functions in mobile phone 40. In other words, Java AP functions are enriched.

Further, when contents and Java AP are activated, the contents whose copyright are abandoned, and the Java AP using data which is not important for security reasons or set to "0" as type designation information, an imperfect encapsulated object is generated and stored in common scratch pad 410d. Unlike in the case of a perfect encapsulated object, data belonging to an imperfect encapsulated object may be accessed by Java AP in this case.

That is to say, although downloaded Java AP is a program which is not secure, with regard to data whose copyright is abandoned, or data which is not important for security reasons, such data is authorized to be accessed by Java AP by processing data as an imperfect encapsulated object. It is obvious to improve a diversification of Java AP when data is authorized to be accessed by Java AP. As compared to using only a perfect encapsulated object, a diversification of Java AP is further improved by using a perfect encapsulated object and an imperfect encapsulated object case by case in accordance with importance of data security or necessity of copyright protection of contents.

<3. Java AP Termination Process>

Next, the Java AP termination process executed by CPU 405 in mobile phone 40 will be described with reference to FIG. 10. The Java AP termination process is executed by CPU 405 as a JAM function, and executed as an interruption process when an execution termination request of Java AP is generated.

Figure 10:
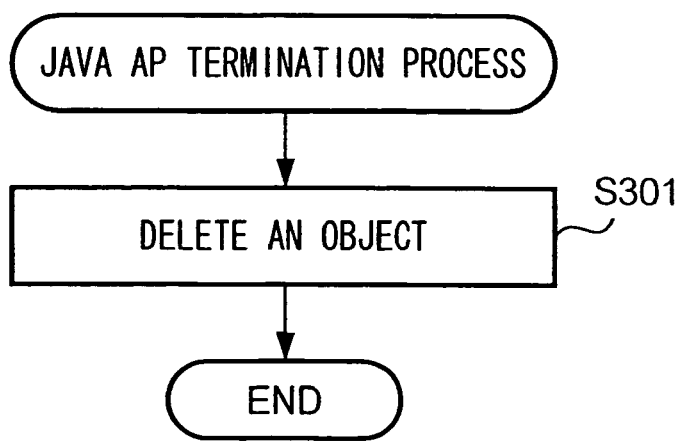
FIG. 10 is a flowchart explaining the termination operation of Java AP executed by CPU in a mobile phone according to the first embodiment.

As shown in FIG. 10, CPU 405 in mobile phone 40 deletes a perfect encapsulated object and an imperfect encapsulated object stored in common scratch pad 410d when a Java AP termination request is generated (Step S301). A perfect encapsulated object and an imperfect encapsulated object deleted at Step S301 are generated in the object generation process (refer to FIG. 8) in the activation process of Java AP, and stored in common scratch pad 410d. CPU 405 terminates Java AP termination process after deleting the above objects from common scratch pad 410d.

Further, by generating a perfect encapsulated object and an imperfect encapsulated object and storing the objects in common scratch pad 410d when downloaded Java AP is activated, and by deleting a perfect encapsulated object and an imperfect encapsulated object from common scratch pad 410d when the execution of downloaded Java AP is terminated, efficient use of memory resources in mobile phone 40 is ensured as it is not always necessary to store the objects in common scratch pad 410d.

Further, mobile phone 40 executes a process related to the present invention (object generation process, access management process, Java AP termination process) in accordance with a program stored in ROM 408 or nonvolatile memory 410, but a program for executing the above process may be provided to mobile phone 40 by communication. Further, a program for executing the above process may be provided to mobile phone 40 by using a recording media such as a optional recording media, a disc recording media, and a semiconductor memory, but a recording media drive for reading out a program from a recording media is necessary in the case of providing a program to mobile phone 40 by a recording media.

B. Modifications

While the invention has been described with reference to its currently best-known modes of operation and embodiments, other modes, embodiments and advantages of the present invention will be apparent to those skilled in the art and are contemplated herein. Although those skilled in the art would recognize that other embodiments of the present invention are envisioned, the following claims define the broad scope of the present invention. Further, the present invention may have the following modifications.

<Modification 1>

In the above embodiment, the case using a perfect encapsulated object or an imperfect encapsulated object is described, however, a case using only a perfect encapsulated object may be described. That is to say, data to be used by downloaded Java AP may be processed as a perfect encapsulated object. In this case, type designation information is not necessary. Further, type designation information table 410a is used in the above embodiment; however, type designation information table 410a is not necessary if type designation information is provided to address book data, e-mail data, and contents.

<Modification 2>

In the above embodiments, a perfect encapsulated object or an imperfect encapsulated object is generated in the case of instructing to execute the downloaded Java AP, the timing for generating a perfect encapsulated object and an imperfect encapsulated object is not restricted to only at the time of instructing of execution of Java AP.

For example, at the time of turning on mobile phone 40, a perfect encapsulated object for data or an imperfect encapsulated object for data may be generated by referring to type designation information table 410a. In this case, when original data such as address book data, e-mail data, incoming and outgoing call data, and user data is updated, the data in a perfect encapsulated object or an imperfect encapsulated object needs to be updated in accordance with updating details, the perfect encapsulated object and the imperfect encapsulated object both being stored in common scratch pad 410d.

Accordingly, to execute generation process of a perfect encapsulated object for data or an imperfect encapsulated object at the time of activating mobile phone 40, it is necessary that API is provided with an original extended library in accordance with updating details of original data, the API for updating encapsulated data in an object. Further, when a perfect encapsulated object or an imperfect encapsulated object is stored in common scratch pad 410d continuously, it is obvious that the deletion of a perfect encapsulated object or an imperfect encapsulated object is not necessary from common scratch pad 410d in accordance with the termination of executing a Java AP.

<Modification 3>

In the above embodiment, it is further possible that security level information is provided to data, the security level information for indicating importance of security which is "1" (importance "High") to "5" (importance "Low"), and data belonging to security level information of "1" to "3" is processed as a perfect encapsulated object while data belonging to security level information of "4" to "5" is processed as an imperfect encapsulated object.

<Modification 4>

With regard to Java AP downloaded to mobile phone 40, if Java AP is judged by a third party such as a telecommunication company managing mobile packet communication network 30, or CA (Certified Authority) and authorized as a program which meets some criteria, Java AP is regarded as a secure program as well as a native application.

Accordingly, if Java AP is authorized by a third party, even downloaded Java AP may obtain data to be used directly from nonvolatile memory 410. Of course, identification information is provided to Java AP authorized by a third party, the identification information for indicating that the Java AP is an authorized program by a third party. That is to say, in mobile phone 40, to determine whether downloaded J mobile packet Java AP is an authorized program by a third party, it is necessary to check whether identification information is provided to downloaded Java AP.

<Modification 5>

In the above embodiment, it is configured such that content server 10 is connected to the Internet 20. However, it is also configured such that content server 10 is directly connected to gateway server 31 in mobile packet communication network 30 through an exclusive line. Further, it is configured that gateway server 31 has a function of content server 10. Further, it is configured that content server 10 is installed in mobile packet communication network 30.

<Modification 6>

Figure 11:
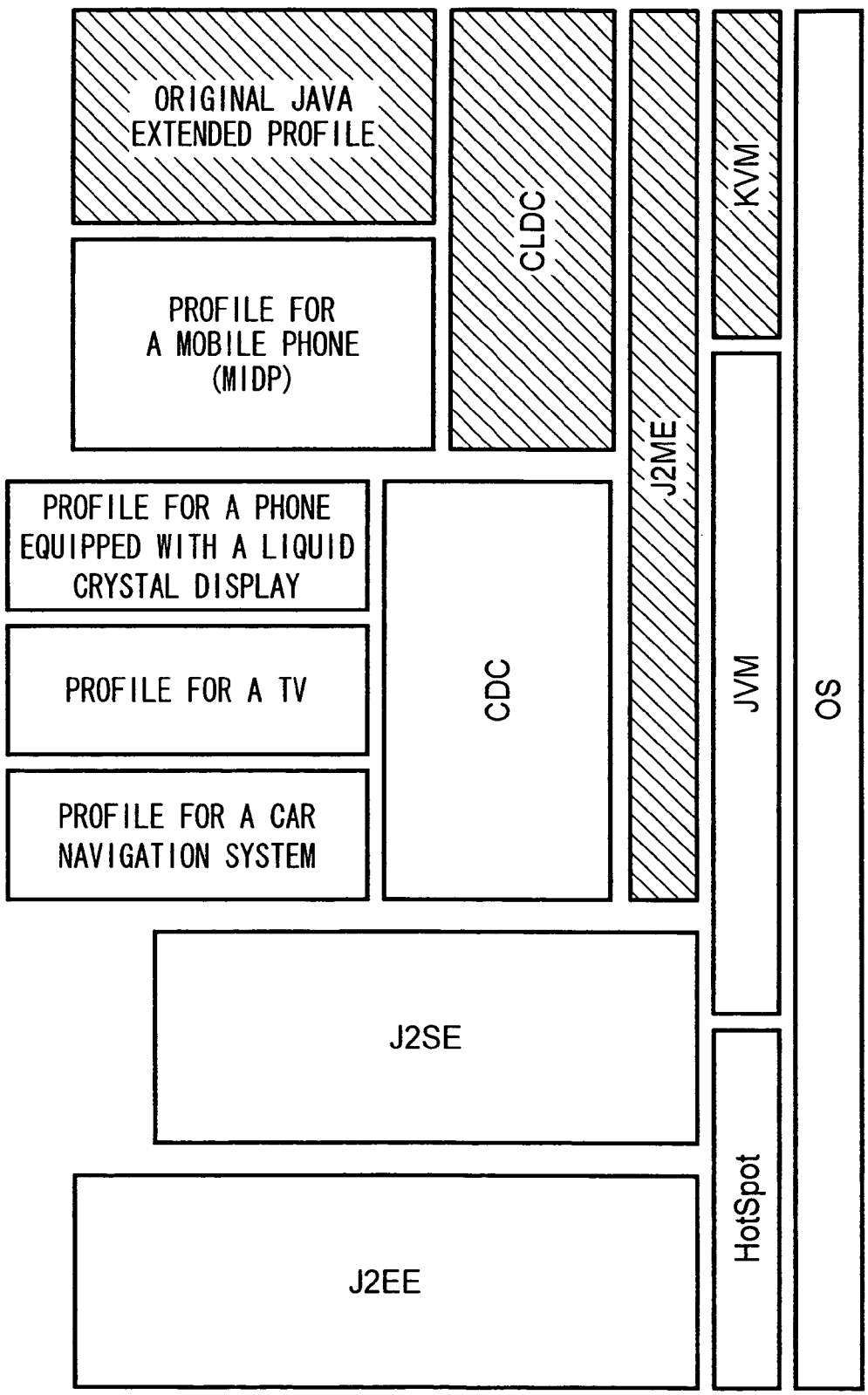
FIG. 11 is a diagram explaining the modifications of the Java execution environment according to the modification 6 of the present invention.

In the above embodiments, as shown by hatching in FIG. 11, it is described that the present invention is applied to mobile phone 40 comprised of KVM, CLDC as a configuration, and J2ME having an original Java extended profile. However, a Java execution environment is not restricted only to a combination of KVM and J2ME. Further, a communication device used in the present invention is not restricted to a mobile phone.

For example, as shown in the figure, MIDP (Mobile Information Device Profile) may be used as a J2ME profile instead of an original Java extended profile. Further, JVM instead of KVM, CDC (Connected Device Configuration) instead of CLDC as a configuration for J2ME may be used in the configuration. Moreover, a profile for a phone equipped with a liquid crystal display, a profile for a TV, a profile for a car navigation system and the like may be used as a profile for J2ME in the configuration. Further, HotSpot, J2SE (Java 2 Standard Edition), or J2EE (Java 2 Enterprise Edition) may be used in the configuration.

Figure 12:
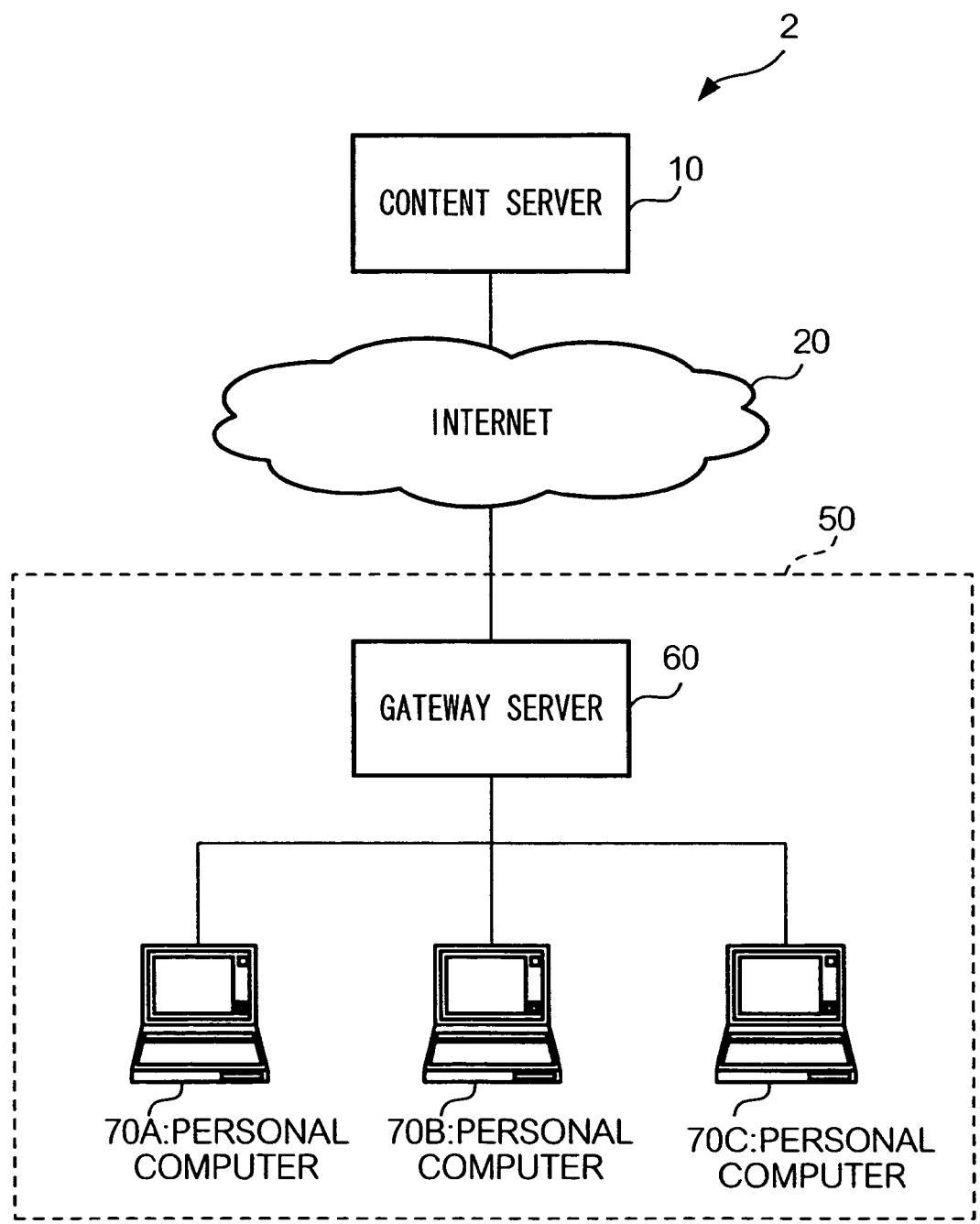
FIG. 12 is a diagram exemplifying the modification 6 of a communication system according to the modifications of the present invention.

Further, as is obvious from modifications of a Java execution environment as described above, the present invention may be applied to various types of electronic devices having communication functions, such as a PHS (Personal Handy System®), a PDA (Personal Digital Assistant), a car navigation device or a personal computer. Further, the present invention is not limited to communication devices stored in mobile packet communication network 30. For example, the present invention may be applied to a personal computer 70A, 70B, and 70C in communication system 2 shown in FIG. 12.

Further, in the above embodiments, it is described that Java AP written in a Java programming language is used; however, programming language is not restricted to Java.

<Modification 7>

Further, in the above embodiments, a perfect encapsulated object with regard to telephone book data is exemplified; however, method and data, both of which belong to a perfect encapsulated object are not restricted to telephone book data. A method may be used for displaying image or motion data such as static image, 3D image, motion picture, and Macromedia Flash®. Further, a method may be used for playing voice or music data in a playing unit of mobile phone 40.

EFFECT OF THE INVENTION

As described above, the present invention makes it possible to ensure security for received programs in a communication device, and to enrich functions to be used by the received programs in a communication device as compared with the prior arts.

The invention claimed is:

1. A non-transitory computer readable storage medium with computer program code embodied thereon, the computer program code executable on a processor of a communication device, the computer program code comprising:
   an instruction to identify specified data stored on the communication device to be used by a program stored in a memory of the communication device during execution of the program on the communication device, and wherein the communication device is configured to store the specified data among data stored in a first portion of the memory of the communication device, wherein the data stored in the first portion of the memory is accessible by trusted programs;
   an instruction to determine, in response to a request to execute the program, whether the program is a trusted program of the trusted programs;
   an instruction to generate, based upon determination that the program is an untrusted program, a perfect encapsulated object in a second portion of the memory allocated for use by the program, wherein the perfect encapsulated object is configured to encapsulate the specified data and prohibit the program from accessing said encapsulated specified data during execution of the program, and wherein the perfect encapsulated object specifies at least one external method to allow the program to instruct the encapsulated object to perform an operation with the encapsulated specified data on the communication device, without permitting the program to access the encapsulated specified data;
   an instruction to restrict access by the program, in further response to determination that the program is the untrusted program, to resources of the communication device and prohibit access, by the program, to the specified data stored in the first portion of the memory; and
   an instruction, in response to an operation of the program to use the at least one external method specified by the perfect encapsulated object, to instruct the perfect encapsulated object to perform the operation with the encapsulated specified data on the communication device without permitting the program to access the encapsulated specified data.

2. The non-transitory computer readable storage medium of claim 1, the computer program code further comprising:
   an instruction to determine, in response to determination that the program is the untrusted program, whether data protection of the specified data is necessary based upon data protection information related to the specified data;
   an instruction to generate, in response to determination that data protection of the specified data is unnecessary, an imperfect encapsulated object in the second portion of the memory, wherein the imperfect encapsulated object encapsulates the specified data, and wherein the imperfect encapsulated object specifies a first method to permit the program to control use of the encapsulated specified data by the communication device without permitting the program to access to the encapsulated specified data, and a second method to permit the program to access the encapsulated specified data; and
   wherein the instruction to generate, in response to determination that the program is the untrusted program, the perfect encapsulated object in the second portion of the memory allocated for use by the program comprises:
   an instruction to generate, in response to determination that data protection of the specified data is necessary, the perfect encapsulated object for use by the program in the second portion of the memory.

3. The non-transitory computer readable storage medium of claim 2, wherein at least one of the perfect encapsulated object and the imperfect encapsulated object is generated, the computer program code further comprising:
   an instruction to delete from the second portion of memory, in response to termination of the program, the at least one of the perfect encapsulated object and the imperfect encapsulated object generated by the communication device for use by the program.

4. The non-transitory computer readable storage medium of claim 2, wherein at least one of the perfect encapsulated object and the imperfect encapsulated object is generated, wherein the instruction to generate the at least one of the perfect encapsulated object and the imperfect encapsulated object is executed after the communication device commences execution the program; and
   the computer program code further comprising:
   an instruction to delete, in response to termination of the program, the at least one perfect encapsulated object and imperfect encapsulated object generated by the communication device for use by the program.

5. The non-transitory computer readable storage medium of claim 2, the computer program code comprising the instruction to identify specified data stored on the communication device to be used by the program during execution of the program on the communication device comprises:
   an instruction to identify, in response to execution of the program, the specified data during execution of the program.

6. The non-transitory computer readable storage medium of claim 2, the computer program code further comprising:
   an instruction to determine a security level associated with the specified data stored in the communication device;
   an instruction to store, in response to determination that the security level associated with the specified data is high, security level information related to the specified data, wherein the security information indicates that protection of the specified data is necessary; and
   an instruction to store, in response to determination that the security level associated with the specified data is low, the security information related to the specified data, wherein the security information indicates that protection of the specified data is unnecessary.

7. The non-transitory computer readable storage medium of claim 2, the computer program code further comprising:

an instruction to store copyright information related to the specified data on the communication device, wherein the copyright information indicates that data protection of the specified data stored in the communication device is necessary;

an instruction to determine whether to protect the specified data stored on the communication device based upon the copyright information related to the specified data;

an instruction to set, in response to determination that data protection of the specified data is necessary, a copyright protection flag related to the specified data to indicate that the specified data is copyright protected; and an instruction to set, in response to determination that data protection of the specified data is unnecessary, the copyright protection flag related to the specified data to indicate that copyright protection of the specified data is unnecessary.

8. The non-transitory computer readable storage medium of claim 2, the computer program code further comprising:

an instruction to receive, from a user interface of the communication device, a user instruction indication; and an instruction to store, in response to receipt of the user instruction indication, the data protection information related to the specified data in accordance with the user instruction indication.

9. The non-transitory computer readable storage medium of claim 2, wherein at least one of the perfect encapsulated object and the imperfect encapsulated object is generated, the computer program code further comprising:

an instruction to update the encapsulated specified data of the at least one of the perfect encapsulated object and imperfect encapsulated object in the second portion of the memory based upon an update to the specified data stored in the first portion of the memory of the communication device.

10. The non-transitory computer readable storage medium of claim 2, wherein the program comprises instructions compliant with a JAVA™ programming language; and the computer program code further comprising:

an instruction to generate a JAVA™ execution environment to execute the program.

11. The non-transitory computer readable storage medium of to claim 2, wherein the encapsulated data includes character string data;

wherein the at least one external method specified by the perfect encapsulated object includes a method for displaying the character string data on a display unit of the communication device; and the computer program code further comprising:

an instruction to display character string data on the display unit of the communication device in accordance with the method specified by the perfect encapsulated object for displaying character string data.

12. The non-transitory computer readable storage medium of claim 2, wherein the encapsulated data includes voice data;

wherein the at least one external method specified by the perfect encapsulated object includes a method for reproducing voice data with the communication device; and the computer program code further comprising:

an instruction to reproduce the voice data with the communication device in accordance with the method for reproducing voice data with the communication device.

13. The non-transitory computer readable storage medium of claim 2, wherein the at least one method specified by the perfect encapsulated object includes a method for displaying image data on a display unit of the communication device; and the computer program code further comprising:

an instruction to display image data on the display unit of the communication device in accordance with the method for displaying image data specified by the perfect encapsulated object.

14. The non-transitory computer readable storage medium of claim 1, wherein the computer program code comprising the instruction to generate the perfect encapsulated object for use by the program further comprises:

an instruction to generate the perfect encapsulated object after identification of the specified data to be used by the program in accordance with the at least one external method specified by the perfect encapsulated object.

15. The non-transitory computer readable storage medium of claim 14, wherein the computer program code comprising the instruction to generate the perfect encapsulated object for use by the program further comprises:

an instruction to determine whether the specified data is subject to data protection based upon at least one of copyright information and security information associated with the specified data; and an instruction to generate, in response to determination that the specified data is subject to data protection, the perfect encapsulated object.

16. The non-transitory computer readable storage medium of claim 1, wherein the communication device receives the program through the communication network from an internet source; and wherein the computer program code comprising the instruction to identify whether the program is the trusted program of the trusted programs comprises:

an instruction to determine whether the program was received from the internet source; and an instruction to identify, in response to determination that the program was from the internet source, the program as the untrusted program.

17. The non-transitory computer readable storage medium of claim 1, wherein the instruction to determine whether the program is a trusted program of the trusted programs comprises:

an instruction to determine whether the program is at least one of a native program and a secured downloaded program certified by a certification authority based upon identification information associated with the program;

an instruction to identify the program as the trusted program based upon to determination that the program is at least one of the native program and the secured downloaded program certified by the certification authority; and an instruction to identify the program as the untrusted program based upon determination that the program fails to be at least one of the native program and the secured downloaded program certified by the certification authority.

18. The tangible computer readable storage medium of claim 1, wherein the memory further comprises a type designation table, the type designation table includes type designation information data stored in the first portion of the memory, and the type designation information includes at least one of a perfect encapsulated type indication and an imperfect encapsulated type indication;

wherein to determine whether the data is subject to protection, the processor is further configured to retrieve the type designation information for the data from the type designation table; and in response to determination that the type designation information for the data includes a prefect encapsulated type indication, the processor identifies the data as being subject to protection.

19. A communication device comprising:
a communication unit in communication with a mobile communication network, wherein the communication unit is configured to receive a program;
a memory;
a processor in communication with the communication unit and the memory, wherein the processor is configured to, after receipt of the program, identify data stored in the memory of the communication device to be used during execution of the received program;
after identification of the identified data, the processor is further configured to determine whether the data is subject to protection;
after determination that the data is subject to protection, the processor is further configured to encapsulate the identified data in a perfect encapsulated object, wherein the perfect encapsulated object is configured to receive an instruction from outside the perfect encapsulated object to perform an operation with the encapsulated data, and wherein the encapsulated data is inaccessible to the received program; and
the processor is further configured to, during execution of the received program, permit the program to control the encapsulated data of the perfect encapsulated object according to the instruction to perform the operation with the encapsulated data without permitting the program to access the encapsulated data.

20. A communication method using a communication device, the communication method comprising:
in response to a request to execute a program on said communication device, identifying, with the communication device, data stored in a first portion of a memory of the communication device to be utilized by the program during execution of the program, wherein a type designation table stored in the memory includes type designation information for the identified data stored in the first portion of the memory, and the type designation information includes at least one of a perfect encapsulated type indication and an imperfect encapsulated type indication;
in response to identification of the identified data stored in the first portion of the memory on the communication device to be utilized by the program, determining, with the communication device, whether the type designation information for the identified data is set to the perfect encapsulated type indication;
in response to determination that the type designation information for the identified data is set to the perfect encapsulated type indication, generating, in a second portion of the memory with the communication device, a perfect encapsulated object, wherein the perfect encapsulated object encapsulates the identified data, and wherein the perfect encapsulated object further specifies an external method to instruct the perfect encapsulated object to perform a function with said encapsulated data without permitting the program to access the encapsulated data; and
in response to an operation of the program, instructing the perfect encapsulated object to process the encapsulated data in accordance with the external method of the perfect encapsulated object while prohibiting the program from accessing the encapsulated data and the identified data stored in the first portion of the memory.

21. The communication method of claim 20,
wherein in response to determination that the type designation information for the identified data is set to the perfect encapsulated type indication, generating, with the communication device, the perfect encapsulated object, comprises:
determining, with the communication device, whether the program is a trusted program based upon identification information associated with the program; and
in response to determination that the program is an untrusted program, generating, with the communication device, the perfect encapsulated object.

22. The communication method of claim 21, further comprising:
determining, with the communication device, whether the program was received from the Internet; and
wherein generating, in the second portion of the memory with the communication device, the perfect encapsulated object further comprises:
determining whether the program is downloaded from the Internet; and
in response to determination that the program is downloaded from the internet, generating the perfect encapsulated object.

23. The communication method of claim 21, further comprising:
in response to termination of the program, deleting, with the communication device, the at least one perfect encapsulated object and imperfect encapsulated object generated by the communication device for use by the program.

24. The communication method of claim 21, further comprising:
in response to determination that the type designation information for the identified data is set to the imperfect encapsulated type indication, generating, in the second portion of the memory with the communication device, an imperfect encapsulated object, wherein the imperfect encapsulated object encapsulates the identified data, and wherein the imperfect encapsulated object specifies a first method to permit a first operation with said encapsulated data by the program, and a second method to permit a second operation to access the encapsulated data by the program.

25. The communication method of claim 21, wherein determining whether the program is the trusted program based upon identification information associated with the program comprises:
determining whether the program is at least one of a native program and a downloaded program certified as secure by a certifying authority; and
in response to determination that the program is the at least one of the native program and the downloaded program certified as secure by the certifying authority, identifying the program as the trusted program;
in response to determination that the program is the trusted program, permitting the program to access the identified data stored in the first portion of the memory of the communication device during execution of the program without creation of at least one of the prefect encapsulated object and an imperfect encapsulated object.

26. The communication method of claim 25, wherein the program is downloaded from an internet; and
wherein determining, with the communication device, whether the program is the trusted program based upon the identification information associated with the program comprises:

in response to determination that the program download from the internet fails to include a certification that the program is secure from the certifying authority, identifying, with the communication device, the program as the untrusted program.

27. The communication method of claim 20, further comprising:
   determining, with the communication device, whether data protection of the identified data is necessary based upon protection information related to the identified data;
   in response to determination that data protection of the identified data is unnecessary, generating, with the communication device, an imperfect encapsulated object, wherein the imperfect encapsulated object encapsulates the identified data, and wherein the imperfect encapsulated object specifies a first method to permit a first operation with the encapsulated identified data by the program, and a second method to permit a second operation to access the encapsulated identified data by the program; and
   wherein in response to determination that the data stored on the communication device is to be utilized by the program, generating, with the communication device, the perfect encapsulated object further comprises:
   in response to determination that data protection of the identified data is necessary, generating, with the communication device, the perfect encapsulated object for use by the program.

28. A communication device comprising:
   a communication unit in communication with a mobile communication network, wherein the communication unit is configured to receive a program;
   a memory;
   a processor in communication with the communication unit and the memory, wherein the processor is configured to determine whether the program includes a certification from a certification authority, and in response to determination that the program lacks the certification from the certification authority, the processor identifies the program as an untrusted program;
   the processor is further configured to identify data stored in a first portion of the memory to be used during execution of the program, and in response to identification of the data, the processor is further configured to determine whether the data is subject to protection;
   in response to determination that the data is subject to protection and the program is the untrusted program, the processor is further configured to encapsulate the data in a perfect encapsulated object stored in a second portion of the memory associated with the execution of the program, wherein the perfect encapsulated object is configured to receive an instruction from outside the perfect encapsulated object to perform an operation with the encapsulated data, and wherein the encapsulated data is inaccessible to the program; and
   during execution of the program, the processor is further configured to permit the program to control the encapsulated data of the perfect encapsulated object according to the instruction to perform the operation with the encapsulated data while prohibiting the program to access the data stored in the first portion of the memory and the encapsulated data stored in the second portion of the memory.

29. The communication device of claim 28, wherein in response to determination that the program is the untrusted program and the data fails to be subject to protection, the processor is further configured to encapsulate the data in an imperfect encapsulated object stored in the second portion of the memory, wherein:
   the imperfect encapsulated object is configured to receive a first instruction from outside the imperfect encapsulated object to perform a first operation with the encapsulated data, wherein the first operation prohibits access to the encapsulated data by the program; and
   the imperfect encapsulated object is further configured to receive a second instruction from outside the imperfect encapsulated object to perform a second operation with the encapsulated data, wherein the second operation permits access to the encapsulated data by the program.

30. The communication device of claim 28, wherein a trusted program stored in the memory includes at least one of a downloaded program including certification from the certification authority and a native program of the communication device; and
   the processor further configured to permit the trusted program to access the data stored in the first portion of the memory.

* * * * *

UNITED STATES PATENT AND TRADEMARK OFFICE
CERTIFICATE OF CORRECTION

PATENT NO. : 7,818,815 B2  
APPLICATION NO. : 10/514685  
DATED : October 19, 2010  
INVENTOR(S) : Dai Kamiya et al.

It is certified that error appears in the above-identified patent and that said Letters Patent is hereby corrected as shown below:

In the Claims

In Column 19, line 43, delete "to" after --of--.

In Column 20, line 57, delete "tangible" and insert --non-transitory--.

In Column 21, line 2, delete "prefect" and insert --perfect--.

In Column 22, line 60, delete "prefect" and insert --perfect--.

Signed and Sealed this  
Eighteenth Day of January, 2011

David J. Kappos  
*Director of the United States Patent and Trademark Office*